US009706538B1

United States Patent

Oroskar et al.

(10) Patent No.: US 9,706,538 B1

(45) Date of Patent: Jul. 11, 2017

(54) FREQUENCY PRIORITY BASED MESSAGE TRANSFER IN LONG TERM EVOLUTION (LTE) SYSTEMS

(71) Applicant: Sprint Communications Company L.P., Overland Park, KS (US)

(72) Inventors: Siddharth Oroskar, Overland Park, KS (US); Jasinder Pal Singh, Olathe, KS (US); Maulik K. Shah, Austin, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 315 days.

(21) Appl. No.: 14/333,626

(22) Filed: Jul. 17, 2014

(51) Int. Cl.

| | |
|---|---|
| ***H04W 4/00*** | (2009.01) |
| ***H04W 72/04*** | (2009.01) |
| ***H04W 76/06*** | (2009.01) |
| *H04W 76/02* | (2009.01) |

(52) U.S. Cl.

CPC ......... *H04W 72/042* (2013.01); *H04W 76/06* (2013.01); *H04W 76/025* (2013.01)

(58) Field of Classification Search

None

See application file for complete search history.

(56) References Cited

U.S. PATENT DOCUMENTS

2012/0157100 A1* 6/2012 Suzuki .................. H04W 48/18 455/435.2
2013/0102277 A1 4/2013 Stenfelt et al.
2014/0113633 A1* 4/2014 Lee ....................... H04W 36/08 455/436
2014/0162669 A1* 6/2014 Dahlen ............. H04W 72/0453 455/450

FOREIGN PATENT DOCUMENTS

WO 2013043088 3/2013

* cited by examiner

*Primary Examiner* — Vinncelas Louis

(57) ABSTRACT

A Long Term Evolution (LTE) wireless access system transfers wireless data to User Equipment (UE) over a first frequency band based on an initial frequency band selection priority. The LTE wireless access system processes a user Identifier (ID) associated with the UE to select a new frequency band selection priority for the UE. The LTE wireless access system transfers a connection release message to the UE indicating the new frequency band selection priority for the UE. The LTE wireless access system receives a data message for the UE and identifies a second frequency band for the UE based on the new frequency band selection priority. The LTE wireless access system transfers the data message to the UE over the second frequency band.

18 Claims, 6 Drawing Sheets

FREQUENCY PRIORITY BASED MESSAGE TRANSFER IN LONG TERM EVOLUTION (LTE) SYSTEMS

TECHNICAL BACKGROUND

Wireless communication services are available to wireless User Equipment (UE) over Long Term Evolution (LTE) networks. In the LTE networks, the UEs wirelessly attach to eNodeBs which are supported by Mobility Management Entities (MMEs). During the attachment process, the MMEs send their Radio Access Technology Frequency Selection Priority (RFSP) indices to the eNodeBs.

The eNodeBs translate these RFSP indices into frequency selection priorities for the UEs. The eNodeBs transfer the frequency selection priorities to the UEs. The UEs process the frequency selection priorities to select their communication frequencies. Typically, a given frequency selection priority comprises an ordered list of frequencies and correlated selection parameters, such as signal strength thresholds, signal-to-noise ratios, hysteresis timers, and the like. The UEs and the eNodeBs communicate over the communication frequencies selected by the UEs based on the frequency selection priorities.

Eventually, the UEs enter the idle mode. In the idle mode, the UEs may periodically read signaling and send status, but the idle UEs do not exchange user data. During idle mode entry, the eNodeBs identify Voice over LTE (VoLTE) users by their Subscriber Profile Identifiers (SPIDs). The eNodeBs send connection release messages instructing the VoLTE UEs to idle using a different frequency selection priority for a time period before reverting to their initial frequency selection priorities.

During idle mode, the VoLTE UEs use the different frequency selection priority to select their communication frequencies for the time period. Thus, the selected communication frequencies may vary during the time period. When the time period expires, the VoLTE UEs again use the initial frequency selection priority to select their communication frequencies. If the eNodeBs receive data messages for idling UEs, then the eNodeBs transfer the messages over the initial communication frequencies. Unfortunately, some of the VoLTE UEs may be idling on a different frequency and miss the message until the data message is resent over a wider range of frequencies.

TECHNICAL OVERVIEW

A Long Term Evolution (LTE) wireless access system transfers wireless data to User Equipment (UE) over a first frequency band based on an initial frequency band selection priority. The LTE wireless access system processes a user Identifier (ID) associated with the UE to select a new frequency band selection priority for the UE. The LTE wireless access system transfers a connection release message to the UE indicating the new frequency band selection priority for the UE. The LTE wireless access system receives a data message for the UE and identifies a second frequency band for the UE based on the new frequency band selection priority. The LTE wireless access system transfers the data message to the UE over the second frequency band.

DETAILED DESCRIPTION

Figure 1:
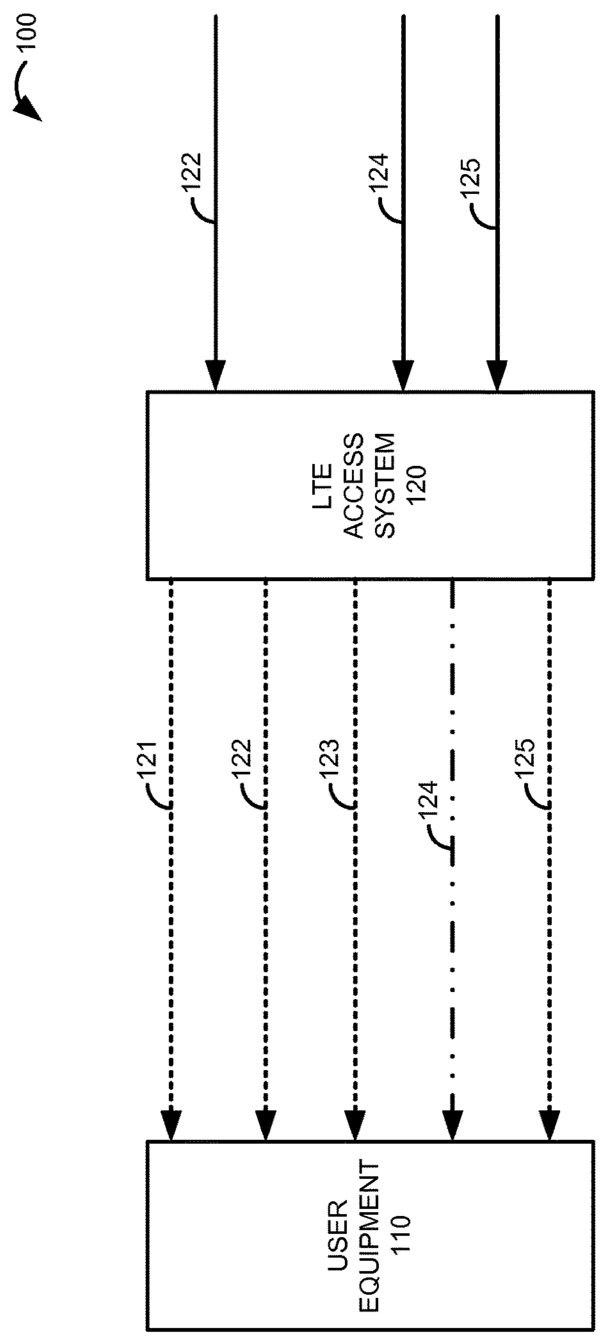
FIGS. 1-3 illustrate a communication system having an LTE access system to direct messages for User Equipment over the proper frequency.
Figure 2:
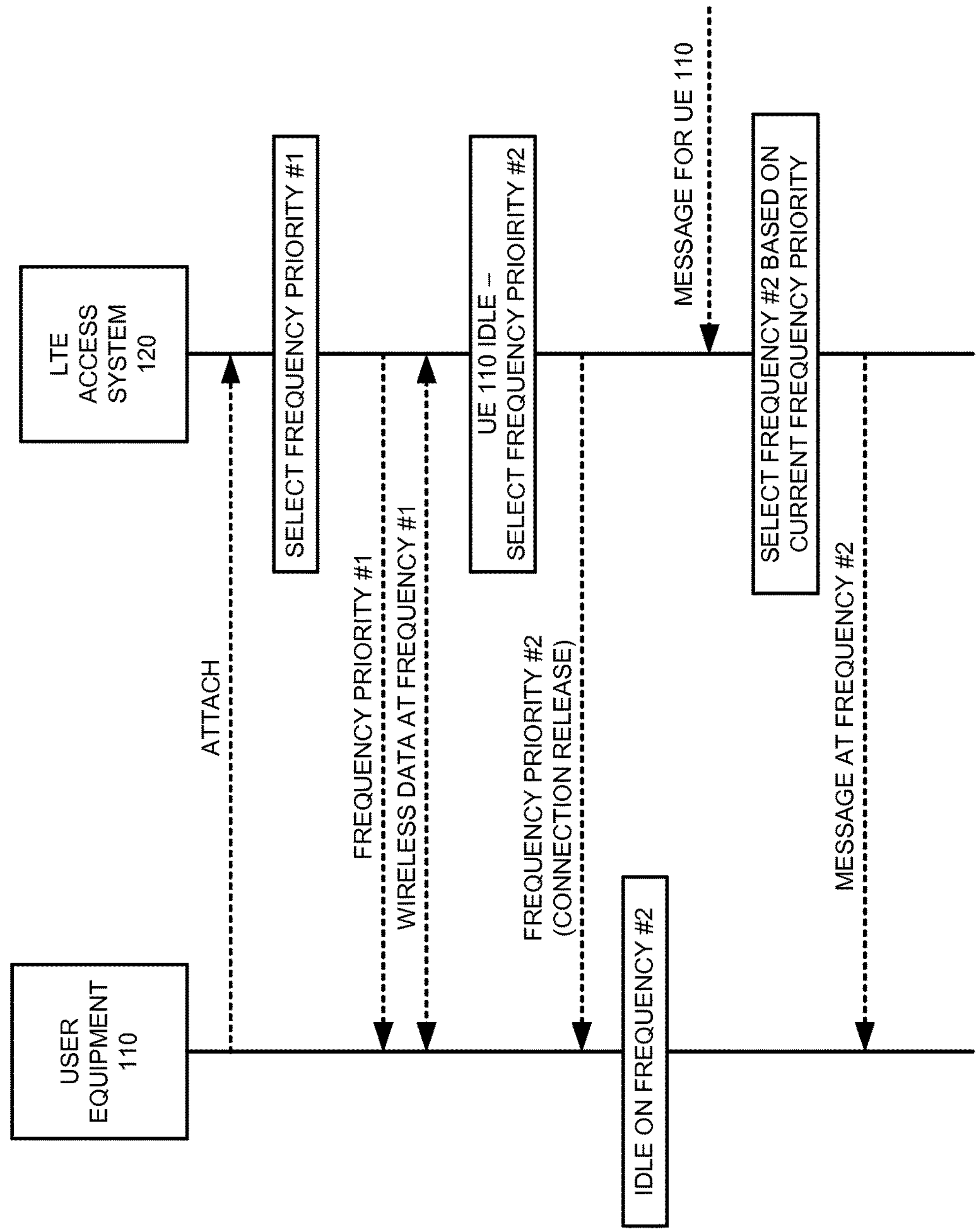
Figure 3:
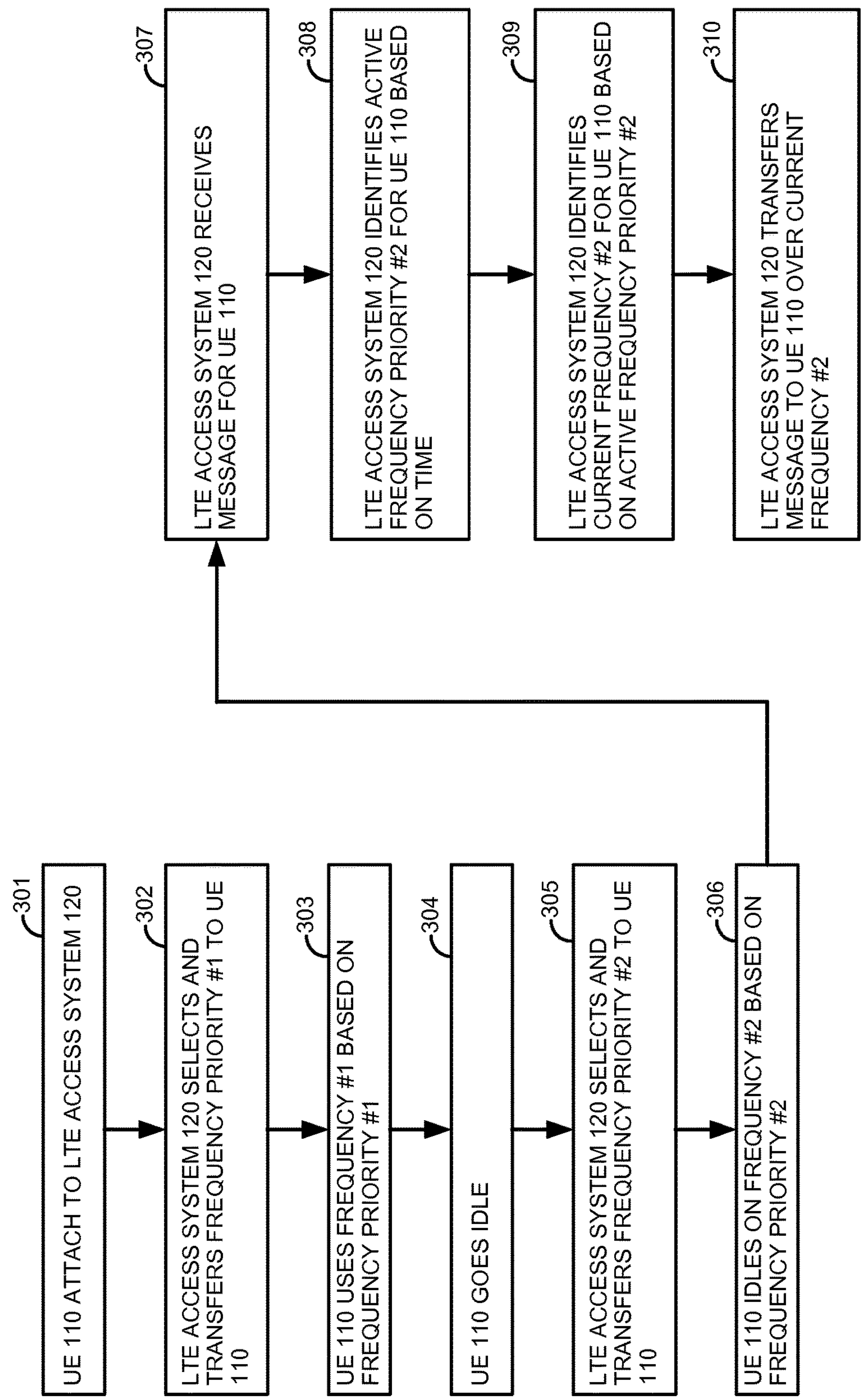

FIGS. 1-3 illustrate communication system 100 having Long Term Evolution (LTE) access system 120 to direct messages for User Equipment (UE) 110 over the proper frequency. UE 110 could be a phone, computer, media player, internet appliance, and/or some other apparatus having wireless transceiver components. LTE access system 120 could be an eNodeB, relay, base station, hotspot, wireless modem, and the like.

LTE access system 120 transfers wireless data 121 to UE 110 over a first frequency band based on an initial frequency band selection priority. In some examples, LTE access system 120 selects the initial frequency band selection priority based on a Radio Access Technology Frequency Selection Priority (RFSP) for communication system 100. LTE access system 120 receives data message 122 for UE 110. LTE access system 120 identifies the first frequency band for UE 110 based on the initial frequency band selection priority. LTE access system 120 transfers data message 122 to UE 110 over the first frequency band.

LTE access system 120 processes a user Identifier (ID) associated with UE 110 to select a new frequency band selection priority for UE 110. In some examples, LTE access system 120 selects the new frequency band selection priority in response to UE 110 entering an idle mode. In some examples, the user ID associated with UE 110 comprises a Subscriber Profile Identifier (SPID) for UE 110. The SPIDs that trigger a priority switch at idle may comprise Voice over LTE (VoLTE) user SPIDs or roaming user SPIDs.

LTE access system 120 transfers connection release message 123 to UE 110 indicating the new frequency band selection priority. In response to connection release message 123 with the new frequency band selection priority, UE 110 idles on the second frequency band instead of the first frequency band.

Subsequently, LTE access system 120 receives data message 124 for UE 110. LTE access system 120 identifies the second frequency band for UE 110 based on the new frequency band selection priority. LTE access system 120 transfers data message 124 to UE 110 over the second frequency band.

Eventually, UE 110 reverts back to the initial frequency band selection priority. For example, the new frequency band selection priority may expire after a time period or some other event may trigger the priority switch. LTE access system 120 then receives data message 125 for UE 110. LTE access system 120 identifies the first frequency band for UE 110 based on the initial frequency band selection priority. LTE access system 120 then transfers data message 124 to UE 110 over the first frequency band.

In some examples, the first frequency band is greater than the second frequency band. For example, the second frequency band may be at a lower frequency that is more suitable for voice users than the higher second frequency band that is more suitable for heavy data users.

In some examples, the first frequency band may be a general-purpose frequency band and the second frequency band may be a specific-purpose frequency band. For example, the first frequency band may be for general internet access and the second frequency band may be reserved for voice call users. In another example, the first frequency band may be for active users and the second frequency band may be reserved for idle users. In yet another, the first frequency band may be for various Quality-of-Service (QoS) users and the second frequency band may be reserved for the high QoS users.

In some examples, LTE access system 120 selects a time period for the new frequency band selection priority. LTE access system 120 transfers the time period for the new frequency band selection priority in connection release message 123. After expiry of the time period, UE 110 and LTE access system 120 automatically revert back to the initial frequency selection priority (and typically to the first frequency band). LTE access system 120 processes the new frequency band selection priority to route messages to UE 110 if the current time is within the time period. In some cases, LTE access system 120 sets a timer for the time period and then processes the new frequency band selection priority to route messages to UE 110 if the timer has not expired. Time stamp comparisons or some other priority-switch tracking technique could be used.

Referring to FIG. 2, UE 110 wirelessly attaches to LTE access system 120, and LTE access system 120 responsively selects frequency priority #1 for UE 110. In some cases, all attaching UEs are given frequency priority #1 by LTE access system 120. LTE access system 120 transfers frequency priority #1 to UE 110. UE selects a frequency band #1 based on frequency priority #1 and exchanges wireless data with LTE access system 120 over frequency band #1. Eventually, UE 110 goes into idle mode.

In response to the idle mode entry by UE 110, LTE access system 120 selects frequency priority #2 based on a user ID, such as an SPID or the like. LTE access system 120 transfers a connection release message to UE 110 indicating new frequency band selection priority #2. In response to the connection release message with frequency band selection priority #2, UE 110 idles on frequency band #2 instead of frequency band #1. LTE access system 120 receives a data message for UE 110. LTE access system 120 selects the second frequency band for UE 110 based on currently active frequency band selection priority #2. LTE access system 120 transfers the data message to UE 110 over frequency band #2.

Referring to FIG. 3, UE 110 wirelessly attaches to LTE access system 120 (301). LTE access system 120 selects and transfers frequency priority #1 to UE 110 (302). UE selects and uses frequency #1 based on frequency priority #1 (303). Eventually, UE 110 goes into idle mode (304). In response to idle mode, LTE access system 120 selects and transfers frequency priority #2 to UE 110 (305). This frequency priority selection is based on a user ID, such as the SPID, International Mobile Subscriber Identity (IMSI), International Mobile Equipment Identity (IMEI), or the like. In response to frequency priority #2, UE 110 idles on frequency #2 instead of frequency #1 (306).

LTE access system 120 receives a data message for UE 110 (307). LTE access system 120 identifies frequency priority #2 as the current priority for UE 110 based on time (308). LTE access system 120 selects frequency #2 for UE 110 based on active frequency priority #2 (309). LTE access system 120 transfers the data message to UE 110 over frequency #2 (310).

Figure 4:
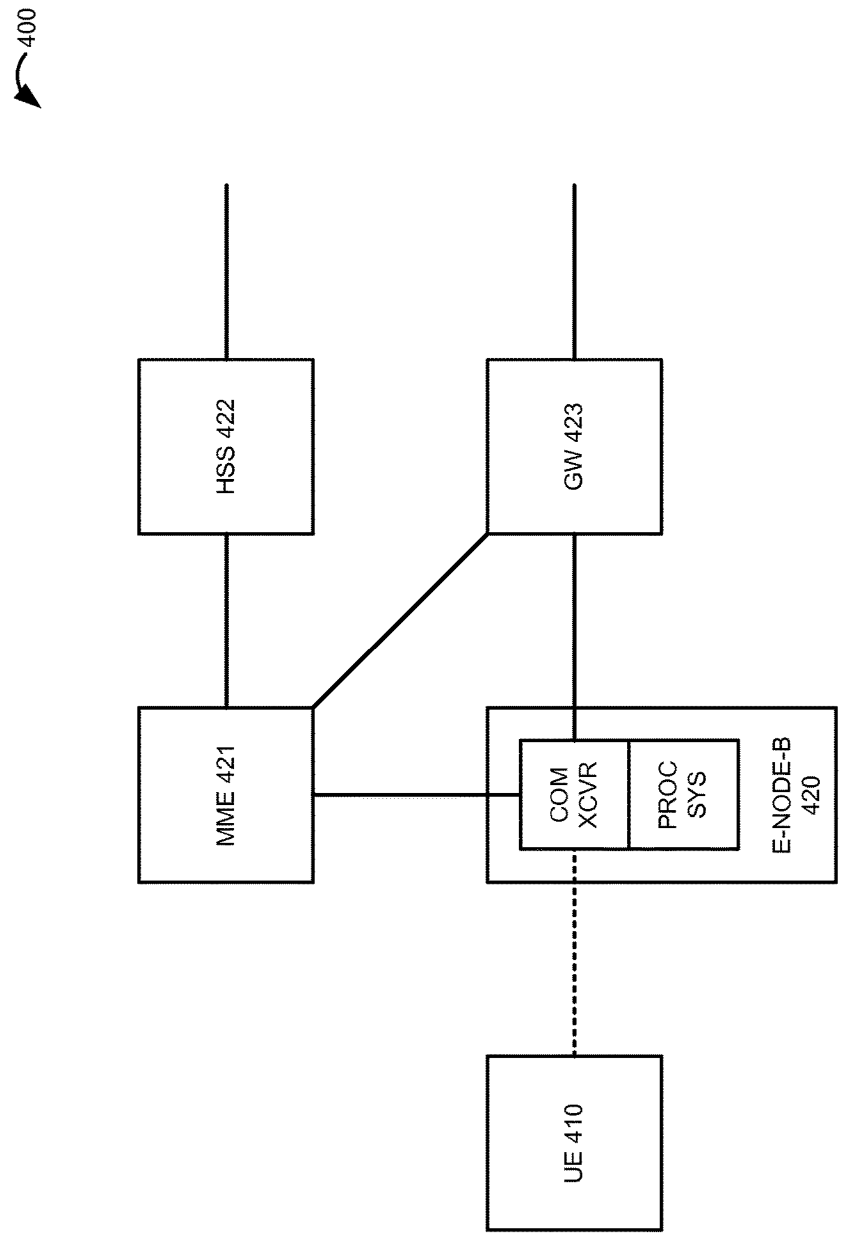
FIGS. 4-5 illustrate an eNodeB and MME to direct messages for User Equipment over the proper frequency.
Figure 5:
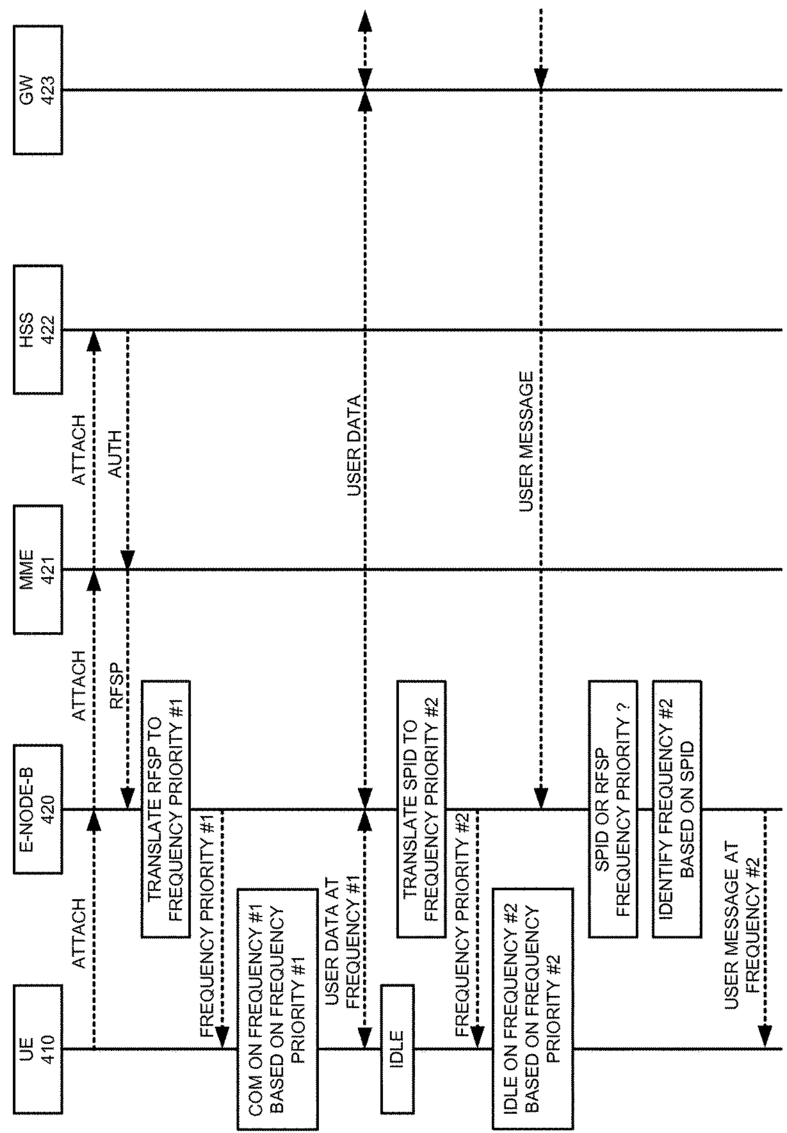

FIGS. 4-5 illustrate communication system 400 having eNodeB 420 and Mobility Management Entity (MME) 421 to direct messages for User Equipment 410 over the proper frequency. Communication system 400 comprises: eNodeB 420, MME 421, Home Subscriber System 422, and Service/Packet Gateway (GW) 423. eNodeB 420 translates multiple data items into the frequency selection priorities that are used by UE 410 to select its wireless communication frequencies. The frequency selection priorities are selected by eNodeB 420 for set time periods before UE 410 reverts to its default frequency selection priority.

To facilitate message routing when UE 420 is idling, eNodeB 420 tracks the data items used to select the current frequency selection priority for UE 410 and the time period for this frequency selection priority. When a data message requires routing to idle UE 410, eNodeB 420 processes these current data items and their time periods to identify the current idling frequency for UE 410. In some examples, eNodeB 420 uses frequency priority timers and data structures to identify the current idling frequency without the need to track the data items. eNodeB 420 transfers the data message to idling UE 410 over the current idling frequency.

Referring to FIG. 5, UE 410 wirelessly attaches to eNodeB 420. eNodeB 420 notifies MME 421 of the attachment by UE 410, and MME 421 authorizes UE 410 through HSS 422. MME 421 indicates the authorization to eNodeB 420 including identifying a Radio Access Technology Frequency Selection Priority (RFSP) for MME 421. eNodeB 420 translates the RFSP into frequency priority #1 for UE 410. eNodeB 420 transfers frequency priority #1 to UE 410 during the attachment process.

UE 410 selects frequency band #1 based on frequency priority #1. UE 410 exchanges wireless data with eNodeB 420 over frequency band #1, and eNodeB 420 exchanges the data with other systems through GW 423. Eventually, UE 410 goes into idle mode.

In response to idle mode for UE 410, eNodeB 420 processes a Subscriber Profile Identifier (SPID) (and/or some other parameter) for UE 410 to select frequency priority #2 and a time period. UE 410 and eNodeB 420 will revert to frequency priority #1 (and typically frequency #1) when the time period expires. The SPID for UE 410 indicates a VoLTE user. Thus, eNodeB 420 selects frequency priority #2 for an idling VoLTE user, and other frequency priorities might be selected for other types of idling users. eNodeB 420 transfers a connection release message to UE 410 indicating frequency priority #2 and the time period. eNodeB 420 sets a timer for the time period.

In response to the connection release message with frequency priority #2, UE 410 idles on the frequency #2. Subsequently, GW 423 receives a data message for UE 420 and forwards the data message to eNodeB 420. eNodeB 420 determines whether RFSP or SPID priority selection should be used based on the SPID timer. In this example, the SPID-based priority is still in use since the timer has not expired, so eNodeB 420 uses frequency priority #2 to identify frequency #2 for UE 410. eNodeB 420 transfers the data message to UE 410 over frequency #2. If the timer had expired, eNodeB 420 would have used frequency priority #1 to identify and transfer the data message to UE 410 over frequency #1.

Figure 6:
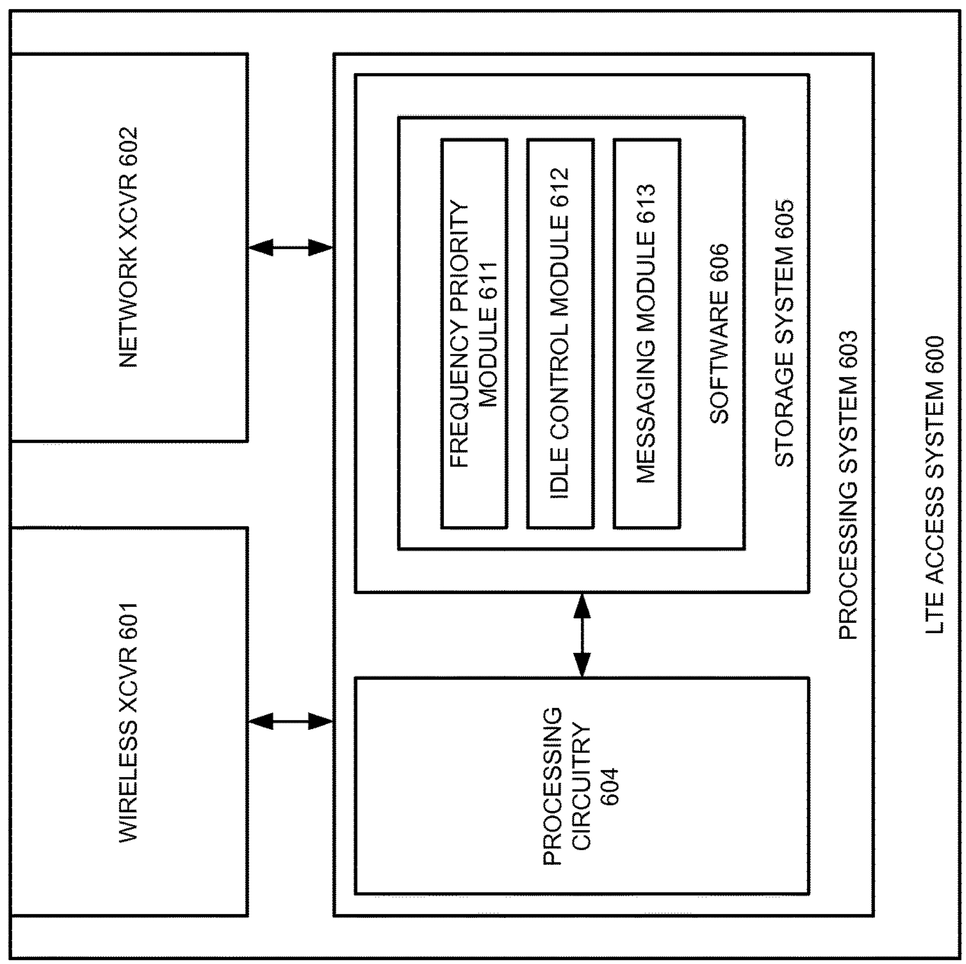
FIG. 6 illustrates an LTE access system to direct messages for User Equipment over the proper frequency.

FIG. 6 illustrates LTE access system 600 to direct messages for User Equipment over the proper frequency. LTE access system 600 is an example of systems 120 and 320, although this equipment may use alternative configurations and operations. LTE access system 600 comprises wireless transceiver 601, network transceiver 602, and processing system 603. Processing system 603 comprises processing circuitry 604 and storage system 605. Storage system 605 stores software 606. Software 606 includes software modules 611-613. Some conventional aspects of LTE access system 600 are omitted for clarity, such as power supplies, enclosures, and the like. LTE access system 600 may be centralized or distributed and may include various virtualized components.

Wireless transceiver 601 comprises wireless LTE communication components, such as antennas, amplifiers, filters, modulators, and the like. Network transceiver 602 comprises network communication components, such as ports, routers, and the like. In processing system 603, processing circuitry 604 comprises circuit boards, integrated circuitry, and associated electronics. Storage system 605 comprises non-transitory, machine-readable, data storage media, such as flash drives, disc drives, memory circuitry, servers, and the like. Software 606 comprises machine-readable instructions that control the operation of processing circuitry 604 when executed. Software 606 includes software modules 611-613 and may also include operating systems, applications, data structures, utilities, databases, and the like. All or portions of software 606 may be externally stored on one or more storage media, such as flash drives, discs, servers, and the like.

When executed by processing circuitry 604, frequency priority module 611 directs circuitry 604 to select frequency priorities for UEs based on various factors including user IDs and operating modes. When executed by processing circuitry 604, idle control module 612 directs circuitry 604 to manage idle UEs and track their current frequency priority by time. When executed by processing circuitry 604, messaging module 613 directs circuitry 604 to route messages to UEs over the proper frequency based their current frequency priority.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Long Term Evolution (LTE) wireless access system comprising:

transferring wireless data to User Equipment (UE) over a first frequency band based on an initial frequency band selection priority;

detecting the UE entering an idle mode and in response, processing a Subscriber Profile Identifier (SPID) associated with the UE to select a new frequency band selection priority and a time period for the UE;

transferring a connection release message indicating the new frequency band selection priority and the time period to the UE over the first frequency band wherein the UE selects a second frequency band based on the new frequency band selection priority;

determining, based on the time period, whether to use the initial frequency band selection priority or the new frequency band selection priority when receiving a data message for the UE, wherein the new frequency band selection priority is reserved for the idle UEs;

when the time period has not expired, transferring the data message over the second frequency band to the UE, wherein the UE uses the second frequency band for the time period and then reverts to the first frequency band upon expiration of the time period; and when the time period has expired, transferring the data message over the first frequency band to the UE.

2. The method of claim 1 further comprising transferring the new frequency band selection priority to the UE upon attachment to the LTE wireless access system.

3. The method of claim 1 wherein the UE idles on the second frequency band responsive to the connection release message and the new frequency band selection priority.

4. The method of claim 1 wherein transferring the new frequency band selection priority to the UE comprises transferring the new frequency band selection priority to a Voice over LTE (VoLTE) UE.

5. The method of claim 1 wherein transferring the new frequency band selection priority to the UE comprises transferring the new frequency band selection priority to a roaming UE.

6. The method of claim 1 wherein transferring the new frequency band selection priority to the UE comprises transferring the new frequency band selection priority to the UE based on a Radio Access Technology Frequency Selection Priority (RFSP).

7. The method of claim 1 wherein the first frequency band is greater than the second frequency band.

8. The method of claim 1 wherein the first frequency band comprises a general-purpose frequency band and the second frequency band comprises a specific-purpose frequency band.

9. The method of claim 1 wherein the wireless access system comprises an eNodeB.

10. A Long Term Evolution (LTE) wireless access system comprising:

a communication interface configured to transfer wireless data to User Equipment (UE) over a first frequency band based on an initial frequency band selection priority;

a processing system configured to detect the UE entering an idle mode and in response, processing a Subscriber Profile identifier (SPID) associated with the UE to select a new frequency band selection priority and a time period for the UE;

the communication interface configured to transfer a connection release message indicating the new frequency band selection priority and the time period to the UE over the first frequency band wherein the UE selects a second frequency band based on the new frequency band selection priority the processing system configured to determine, based on the time period, whether to use the initial frequency band selection priority or the new frequency band selection priority when receiving a data message for the UE, wherein the new frequency band selection priority is reserved for idle UEs;

when the time period has not expired, the communication interface configured to transfer the data message over the second frequency band to the UE, wherein the UE uses the second frequency band for the time period and then reverts to the first frequency band upon expiration of the time period; and when the time period has expired, the communication interface configured to transfer the data message over the first frequency band to the UE.

11. The LTE wireless access system of claim 10 further comprising the communication interface configured to transfer the new frequency band selection priority to the UE upon attachment to the LTE wireless access system.

12. The LTE wireless access system of claim 10 wherein the UE idles on the second frequency band responsive to the connection release message and the new frequency band selection priority.

13. The LTE wireless access system of claim 10 wherein the communication interface configured to transfer the new frequency band selection priority to the UE comprises the communication interface configured to transfer the new frequency band selection priority to a Voice over LTE (VoLTE) UE.

14. The LTE wireless access system of claim 10 wherein the communication interface configured to transfer the new frequency band selection priority to the UE comprises the communication interface configured to transfer the new frequency band selection priority to a roaming UE.

15. The LTE wireless access system of claim 10 wherein the communication interface configured to transfer the new frequency band selection priority to the UE comprises the communication interface configured to transfer the new frequency band selection priority to the UE based on a Radio Access Technology Frequency Selection Priority (RFSP).

16. The LTE wireless access system of claim 10 wherein the first frequency band is greater than the second frequency band.

17. The LTE wireless access system of claim 10 wherein the first frequency band comprises a general-purpose frequency band and the second frequency band comprises a specific-purpose frequency band.

18. The LTE wireless access system of claim 10 wherein the wireless access system comprises an eNodeB.

* * * * *